United States Patent
Taylor et al.

(10) Patent No.: US 11,312,379 B2
(45) Date of Patent: Apr. 26, 2022

(54) OCCUPANCY MAP SYNCHRONIZATION IN MULTI-VEHICLE NETWORKS

(71) Applicant: Rockwell Collins, Inc., Cedar Rapids, IA (US)

(72) Inventors: Max G. Taylor, Houston, TX (US); Christopher M. Boggs, Gainesville, VA (US); Joel J. Fuster, Warrenton, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 244 days.

(21) Appl. No.: 16/277,645

(22) Filed: Feb. 15, 2019

(65) Prior Publication Data

US 2020/0262427 A1    Aug. 20, 2020

(51) Int. Cl.
*B60W 30/165*    (2020.01)
*G08G 5/00*    (2006.01)
*H04W 4/46*    (2018.01)

(52) U.S. Cl.
CPC ......... *B60W 30/165* (2013.01); *G08G 5/0008* (2013.01); *H04W 4/46* (2018.02); *B60W 2556/65* (2020.02)

(58) Field of Classification Search
None
See application file for complete search history.

(56) References Cited

U.S. PATENT DOCUMENTS

| | | | |
|---|---|---|---|
| 8,946,606 B1 * | 2/2015 | Dennison | F41G 7/2293 244/3.16 |
| 8,948,501 B1 * | 2/2015 | Kim | G06K 9/00711 382/159 |

(Continued)

FOREIGN PATENT DOCUMENTS

| | | |
|---|---|---|
| CN | 109117718 A | 1/2019 |
| WO | 2013117001 A1 | 8/2013 |
| WO | 2018038131 A1 | 6/2019 |

OTHER PUBLICATIONS

Lang et al (Semantic 3D Octree Maps based on Conditional Random Fields; http://www.mva-org.jp/Proceedings/2013USB/papers/08-03.pdf (Year: 2013).*

(Continued)

*Primary Examiner* — Kevin P Mahne
*Assistant Examiner* — Tischi Balachandra
(74) *Attorney, Agent, or Firm* — Suiter Swantz pc llo

(57) ABSTRACT

A method for occupancy map synchronization in multi-vehicle networks may include receiving three-dimensional perception sensor (3DPS) data. The method may include generating a data message including an occupancy map (OM) octree. The OM octree may be generated from an occupancy map constructed from the 3DPS data. The method may include reducing at least one of a messaging time or a messaging size of the data message including the OM octree. The method may include transmitting the data message including the OM octree via a leader vehicle controller communicatively coupled to a leader vehicle. The method may include receiving the data message comprising the OM octree via a follower vehicle controller communicatively coupled to the follower vehicle. The method may include generating a local occupancy map from the data message comprising the OM octree via the follower vehicle controller.

3 Claims, 11 Drawing Sheets

(56) References Cited

U.S. PATENT DOCUMENTS

| | | | | |
|---|---|---|---|---|
| 8,958,846 B2* | 2/2015 | Freeny, Jr. | ....... | G06Q 20/40145 |
| | | | | 455/552.1 |
| 9,355,564 B1* | 5/2016 | Tyson | ................. | G08G 5/0091 |
| 9,396,249 B1* | 7/2016 | Balasubramanian | ........................ | |
| | | | | G06F 16/9027 |
| 9,612,123 B1* | 4/2017 | Levinson | .............. | B60W 30/09 |
| 9,754,405 B1* | 9/2017 | Young | ................... | G06T 17/005 |
| 10,402,676 B2* | 9/2019 | Wang | ........................ | G06T 7/73 |
| 10,486,485 B1* | 11/2019 | Levinson | ........... | B60G 17/0165 |
| 10,495,421 B2* | 12/2019 | Abramov | .............. | G05D 1/0016 |
| 10,521,914 B2* | 12/2019 | Lam | ..................... | G06K 9/3233 |
| 10,572,763 B2* | 2/2020 | Rzeszutek | ............... | G01S 17/42 |
| 10,591,918 B2* | 3/2020 | Jen | ....................... | G05D 1/0214 |
| 10,663,590 B2* | 5/2020 | Rzeszutek | ............... | G01S 17/42 |
| 10,726,273 B2* | 7/2020 | Phan | ................... | G06K 9/00771 |
| 10,731,970 B2* | 8/2020 | Cao | ....................... | G01S 7/4802 |
| 10,732,647 B2* | 8/2020 | Shen | .................... | G01C 21/165 |
| 10,740,911 B2* | 8/2020 | Phan | ................... | G06K 9/4604 |
| 10,809,078 B2* | 10/2020 | Tajeddin | ............ | G01C 21/3453 |
| 10,823,572 B2* | 11/2020 | Huang | .................. | G01C 21/20 |
| 10,832,436 B2* | 11/2020 | Lam | .......................... | G06T 7/13 |
| 11,126,204 B2* | 9/2021 | Abramov | ................ | F41H 11/02 |
| 2009/0034792 A1* | 2/2009 | Kennison | ................... | G06F 9/00 |
| | | | | 382/103 |
| 2010/0183192 A1* | 7/2010 | Fritsch | .................... | G06T 7/254 |
| | | | | 382/103 |
| 2010/0315505 A1* | 12/2010 | Michalke | ................. | G06T 7/251 |
| | | | | 348/118 |
| 2011/0106338 A1* | 5/2011 | Allis | .................... | G05D 1/0038 |
| | | | | 701/2 |
| 2014/0195272 A1* | 7/2014 | Sadiq | ..................... | G06Q 40/08 |
| | | | | 705/4 |
| 2015/0045992 A1* | 2/2015 | Ashby | ................... | G05D 1/0287 |
| | | | | 701/2 |
| 2015/0268058 A1* | 9/2015 | Samarasekera | ...... | G08G 5/0073 |
| | | | | 701/409 |
| 2016/0163205 A1* | 6/2016 | Jenkins | ................... | G06T 17/05 |
| | | | | 701/3 |
| 2017/0123428 A1* | 5/2017 | Levinson | ................ | G01S 13/86 |
| 2018/0188743 A1* | 7/2018 | Wheeler | ............. | G06F 16/9024 |
| 2018/0227729 A1* | 8/2018 | Bai | .......................... | G08G 1/22 |
| 2018/0349526 A1* | 12/2018 | Atsmon | .................. | G06T 17/05 |
| 2019/0047564 A1* | 2/2019 | Brady | .................... | B60W 50/08 |
| 2019/0063881 A1* | 2/2019 | Abramov | ............... | G05D 1/104 |
| 2019/0088148 A1* | 3/2019 | Jacobus | ........... | G08G 1/096791 |
| 2019/0120947 A1* | 4/2019 | Wheeler | ............... | G01S 7/4972 |
| 2019/0120967 A1* | 4/2019 | Smits | ..................... | G05D 1/106 |
| 2019/0139403 A1* | 5/2019 | Alam | ..................... | H04W 4/40 |
| 2019/0171227 A1* | 6/2019 | Sujan | .................... | B60W 10/06 |
| 2019/0179338 A1* | 6/2019 | Kim | ...................... | H04W 4/023 |
| 2019/0204853 A1* | 7/2019 | Miller, Jr. | ............... | H04W 4/46 |
| 2019/0294889 A1* | 9/2019 | Sriram | ................ | G06K 9/6274 |
| 2020/0013292 A1* | 1/2020 | Switkes | ................. | G08G 1/166 |
| 2020/0041234 A1* | 2/2020 | Abramov | .............. | B64C 39/024 |
| 2020/0073385 A1* | 3/2020 | Jobanputra | ............ | G06F 9/547 |
| 2020/0117220 A1* | 4/2020 | Paglieroni | ............ | G08G 5/0013 |

OTHER PUBLICATIONS

Choi et al (Efficient multidimensional volume rendering by Choi et al; https://www.spiedigitallibrary.org/conference-proceedings-of-spie; Medical Imaging '99, 1999; hereinafter Choi) (Year: 1999).*

Wurm et al—OctoMap: A Probabilistic, Flexible, and Compact 3D Map Representation for Robotic Systems (Year: 2010).*

Extended Search Report dated Apr. 15, 2020 for EP Application No. 19211334.

Examination Report for European Application No. 19211334.8 dated Apr. 4, 2021, 6 pages.

Office Action dated Nov. 18, 2021 in European Application No. 19211334.8, 6 pages.

* cited by examiner

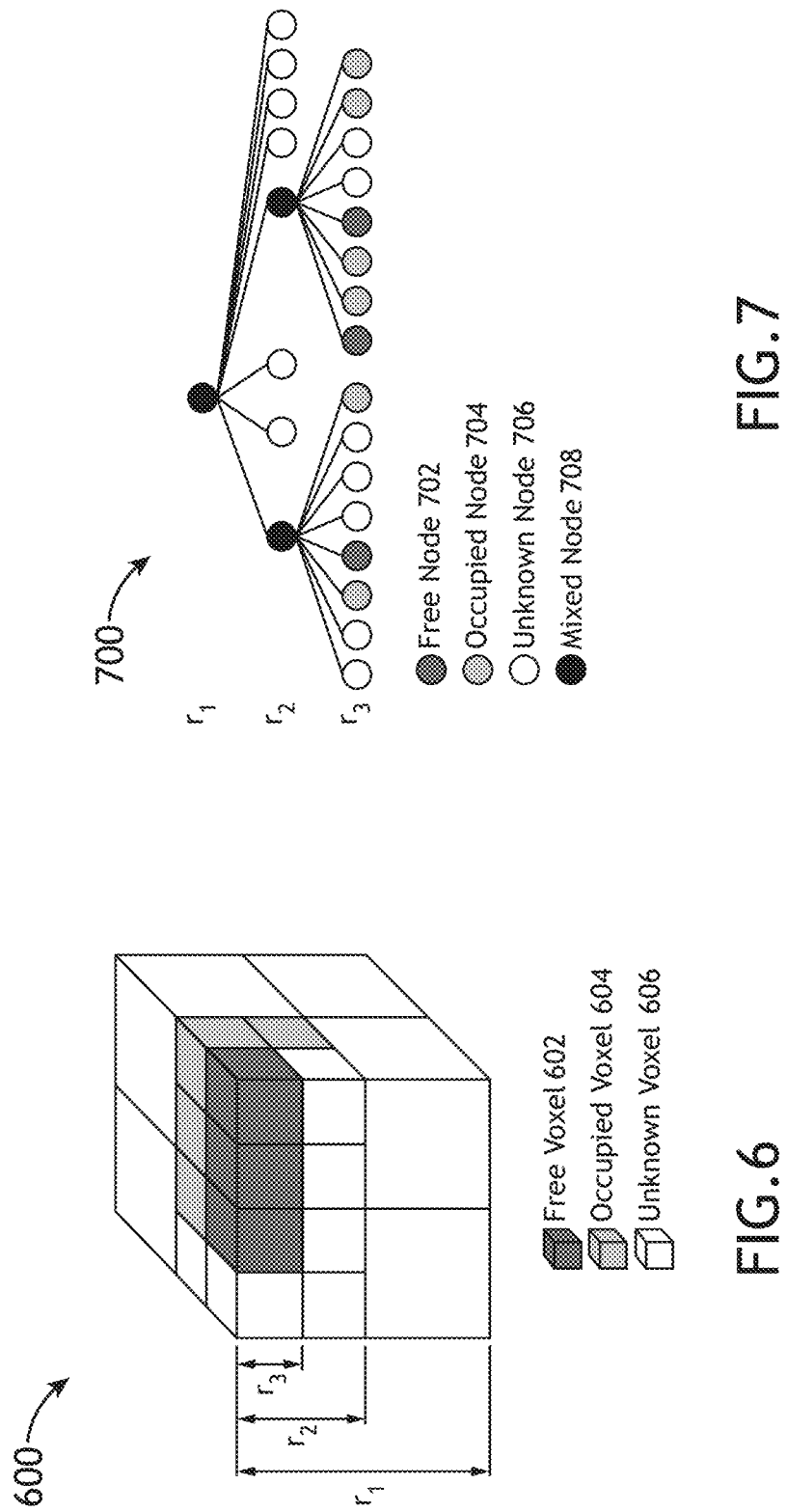

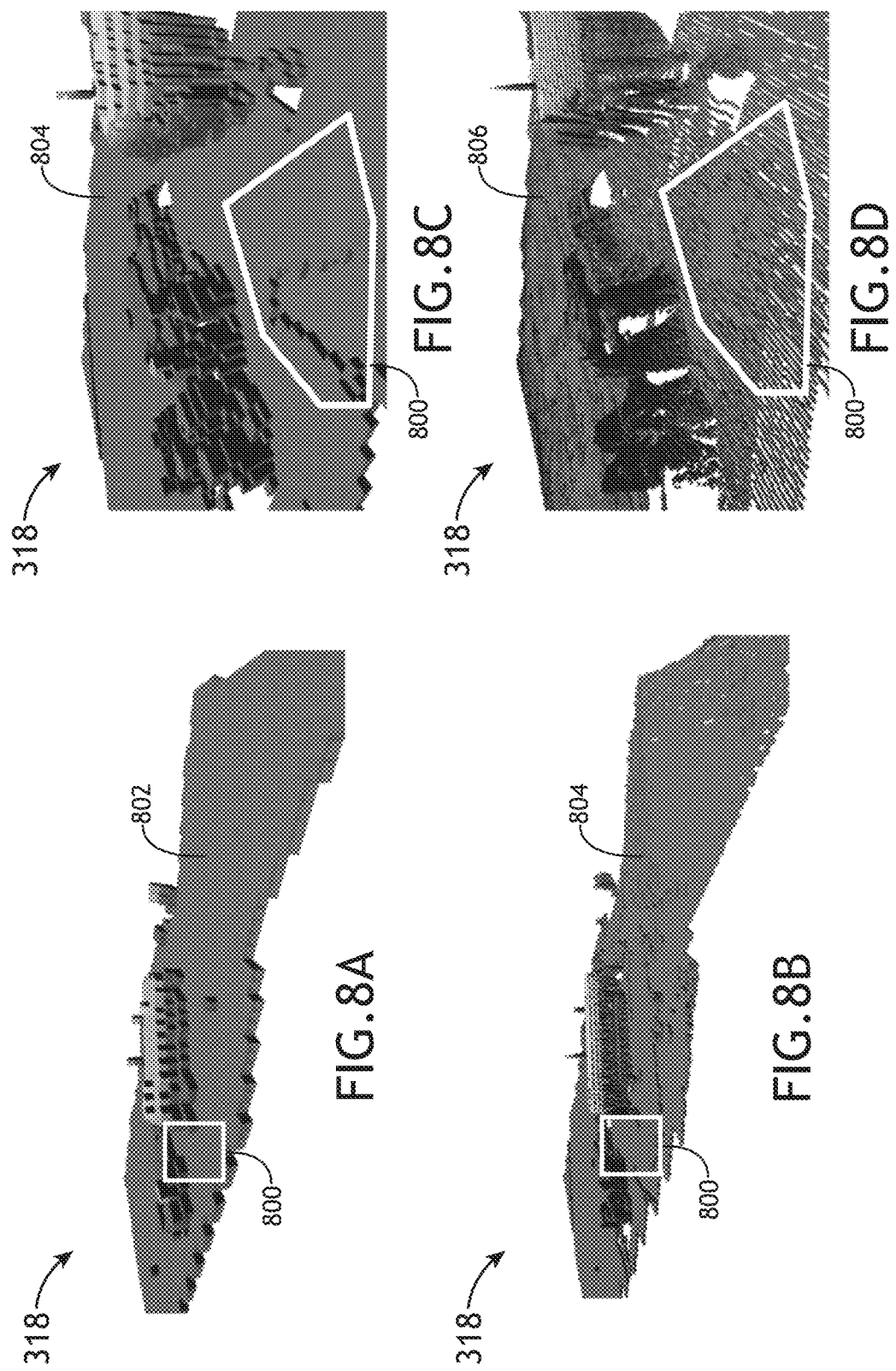

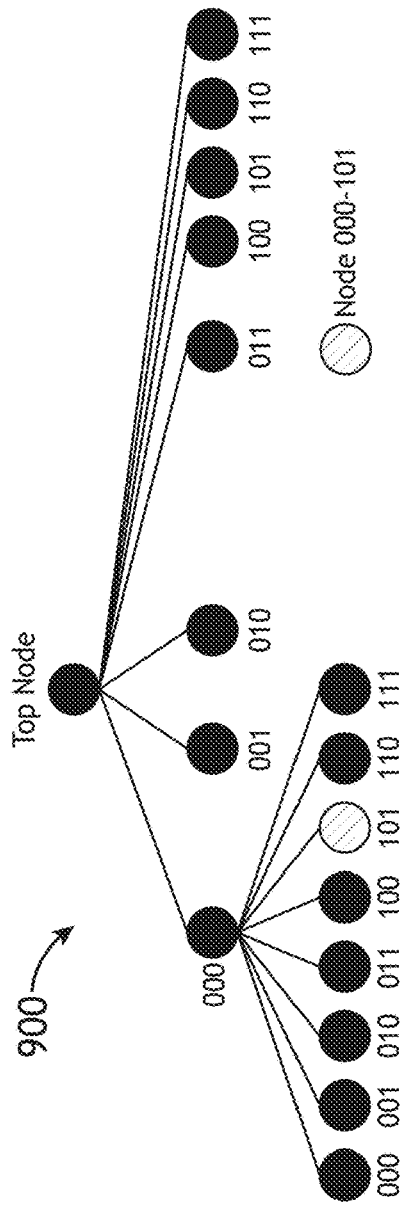
FIG. 9
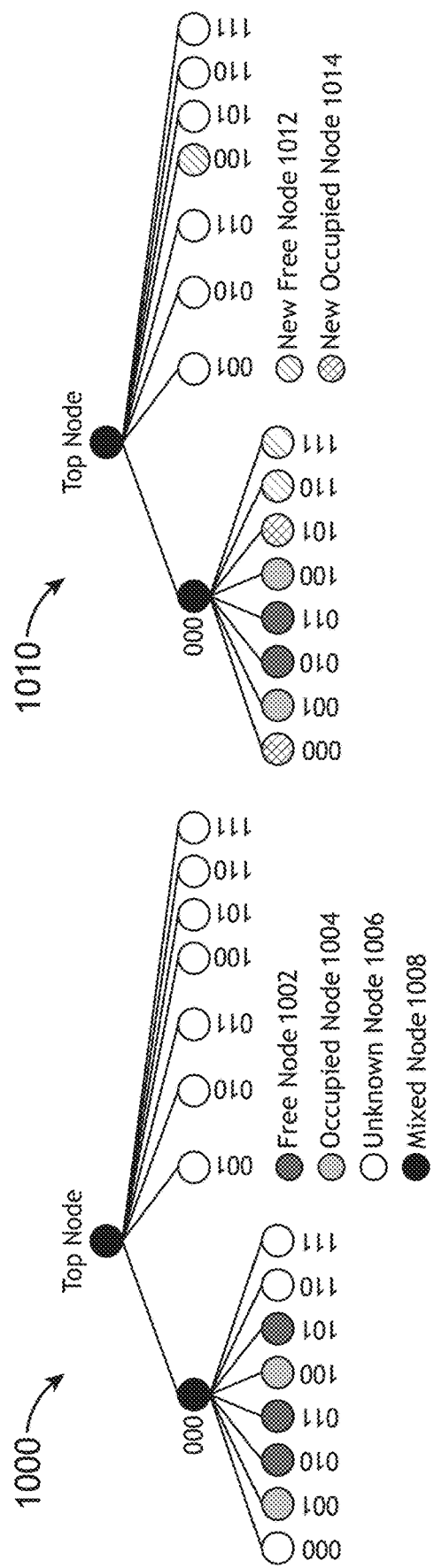
FIG. 10A
FIG. 10B

OCCUPANCY MAP SYNCHRONIZATION IN MULTI-VEHICLE NETWORKS

GOVERNMENT LICENSE RIGHTS

This invention was made with government support under Task Assignment 2016-333-04 under the Vertical Lift Consortium (VLC) Other Transaction Agreement (OTA) W15QKN-16-9-1001, awarded by the Department of Defense. The government has certain rights in the invention.

BACKGROUND OF THE INVENTION

In emerging cognitive decision-aiding (e.g., autonomy) avionics applications, there is a demand to apply data collected from three-dimensional perception sensors (3DPS) mounted to create a common three-dimensional world model (3DWM) that depicts objects in an environment through which an aircraft is maneuvering. The availability of the 3DWM may enable an application to understand the world around a specific location in the environment, with access to the information allowing for an expansion in the level/number and usefulness of the potential cognitive decision-aiding avionics applications.

In select scenarios, a leader vehicle may include the 3DPS while a follower vehicle behind the leader vehicle within a formation (e.g., one subjected to weight constraints) may not include the 3DPS. Despite the lack of 3DPS, however, the follower vehicle may still need a generated 3DWM for cognitive decision-aiding applications. It is noted herein the 3DPS may need to be transmitted by the leader vehicle to the follower vehicle in a manner designed to prevent slow data transfer rates between the leader vehicle and the follower vehicle, and/or designed to prevent delayed response times to objects in the environment by the follower vehicle.

Therefore, it would be advantageous to provide a system and method that cures the shortcomings described above.

SUMMARY

In one aspect, embodiments of the inventive concepts disclosed herein are directed to a system. The system may include a controller. The controller may include one or more processors and memory configured to store one or more sets of program instructions. The one or more processors may be configured to execute the one or more sets of program instructions. The one or more sets of program instructions may be configured to cause the one or more processors to receive three-dimensional perception sensor (3DPS) data. The one or more sets of program instructions may be configured to cause the one or more processors to generate a data message including an occupancy map (OM) octree. The OM octree may be generated from an occupancy map constructed from the 3DPS data. The one or more sets of program instructions may be configured to cause the one or more processors to reduce at least one of a messaging time or a messaging size of the data message including the OM octree. The one or more sets of program instructions may be configured to cause the one or more processors to transmit the data message including the OM octree.

In a further aspect, embodiments of the inventive concepts disclosed herein are directed to a system. The system may include a leader vehicle including a leader vehicle controller. The leader vehicle controller may include one or more processors and memory configured to store one or more sets of program instructions. The one or more processors may be configured to execute the one or more sets of program instructions. The one or more sets of program instructions may be configured to cause the one or more processors to receive three-dimensional perception sensor (3DPS) data. The one or more sets of program instructions may be configured to cause the one or more processors to generate a data message including an occupancy map (OM) octree. The OM octree may be generated from an occupancy map constructed from the 3DPS data. The one or more sets of program instructions may be configured to cause the one or more processors to reduce at least one of a messaging time or a messaging size of the data message including the OM octree. The one or more sets of program instructions may be configured to cause the one or more processors to transmit the data message including the OM octree. The system may include a follower vehicle including a follower vehicle controller. The follower vehicle controller may include one or more processors and memory configured to store one or more sets of program instructions. The one or more processors may be configured to execute the one or more sets of program instructions. The one or more sets of program instructions may be configured to cause the one or more processors to receive the data message including the OM octree. The one or more sets of program instructions may be configured to cause the one or more processors to generate a local occupancy map from the data message including the OM octree.

In a further aspect, embodiments of the inventive concepts disclosed herein are directed to a method. The method may include receiving three-dimensional perception sensor (3DPS) data. The method may include generating a data message including an occupancy map (OM) octree. The OM octree may be generated from an occupancy map constructed from the 3DPS data. The method may include reducing at least one of a messaging time or a messaging size of the data message including the OM octree. The method may include transmitting the data message including the OM octree.

The method may include receiving the data message comprising the OM octree via a follower vehicle. The method may include generating a local occupancy map from the data message comprising the OM octree via a follower vehicle controller communicatively coupled to the follower vehicle. The data message comprising the OM octree may be transmitted via a leader vehicle controller communicatively coupled to a leader vehicle.

It is to be understood that both the foregoing general description and the following detailed description are exemplary and explanatory only and are not necessarily restrictive of the present disclosure. The accompanying drawings, which are incorporated in and constitute a part of the characteristic, illustrate subject matter of the disclosure. Together, the descriptions and the drawings serve to explain the principles of the disclosure.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 6 illustrates an octree cube for a select volume element (voxel), according to the inventive concepts disclosed herein;

FIG. 7 illustrates an octree data structure for a select volume element (voxel), according to the inventive concepts disclosed herein;

FIG. 8A is an example embodiment of a graphical representation of select three-dimensional perception sensor (3DPS) data, in accordance with the inventive concepts disclosed herein;

FIG. 8B is an example embodiment of a graphical representation of select three-dimensional perception sensor (3DPS) data, in accordance with the inventive concepts disclosed herein;

FIG. 8C is an example embodiment of a graphical representation of select three-dimensional perception sensor (3DPS) data, in accordance with the inventive concepts disclosed herein;

FIG. 8D is an example embodiment of a graphical representation of select three-dimensional perception sensor (3DPS) data, in accordance with the inventive concepts disclosed herein;

FIG. 9 illustrates an octree data structure for a select volume element (voxel) with corresponding binary bit code, according to the inventive concepts disclosed herein;

FIG. 10A illustrates a sub-tree data structure for a select volume element (voxel) with corresponding binary bit code, according to the inventive concepts disclosed herein;

FIG. 10B illustrates a delta-tree data structure for a select volume element (voxel) with corresponding binary bit code, according to the inventive concepts disclosed herein;

DETAILED DESCRIPTION OF EXEMPLARY EMBODIMENTS

Figure 1:
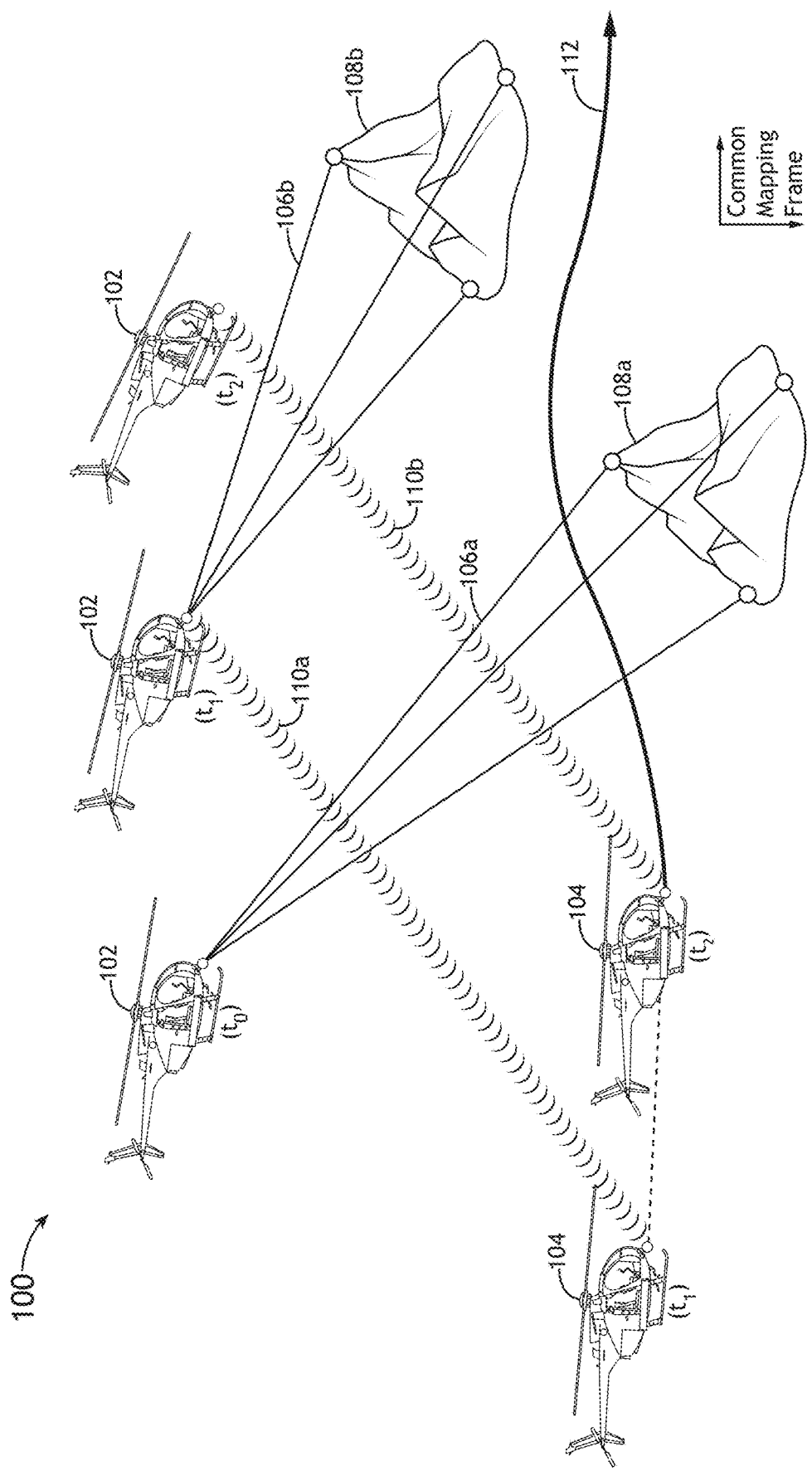
FIG. 1 is an example embodiment of an environment in which occupancy map synchronization in multi-vehicle networks may be implemented, in accordance with the inventive concepts disclosed herein.

Reference will now be made in detail to the subject matter disclosed, which is illustrated in the accompanying drawings.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the inventive concepts disclosed herein in any way unless expressly stated to the contrary.

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

Further, any arrangement of components to achieve a same functionality is effectively "associated" such that the desired functionality is achieved, such that any two components herein combined to achieve a particular functionality can be seen as "associated with" each other (irrespective of architectures or intermedial components). Any two components so associated can also be viewed as being "operably connected" or "operably coupled" to each other to achieve the desired functionality, and any two components capable of being so associated can also be viewed as being "operably couplable" to each other to achieve the desired functionality. Examples of operably couplable include, but are not limited to, physically mateable and/or physically interacting components, wirelessly interactable and/or wirelessly interacting components, logically interacting and/or logically interactable components, or the like.

Further, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

FIGS. 1-13 generally illustrate exemplary embodiments of occupancy map synchronization in multi-vehicle networks, in accordance with one or more embodiments of the present disclosure.

Broadly, embodiments of the inventive concepts disclosed herein are directed to occupancy map synchronization in multi-vehicle networks. More particularly, embodiments of the inventive concepts disclosed herein are directed to occupancy map synchronization in multi-vehicle networks, where three-dimensional world model (3DWM) data is aggregated into occupancy map octrees prior to being transmitted from a leader vehicle to a follower vehicle.

FIG. 1 illustrates an example embodiment of an environment 100 in which occupancy map synchronization in multi-vehicle networks may be implemented, in accordance with the inventive concepts disclosed herein.

The environment 100 may include a leader vehicle 102 and a follower vehicle 104. One or more three-dimension perception sensors (3DPS) mounted to platforms may be onboard the leader vehicle 102. For example, the platforms may include, but are not limited to, light detection and ranging (LIDAR) platforms, radio detection and ranging (RADAR) platforms, optical structure from motion (SfM) platforms, or the like. The 3DPS of the leader vehicle 102 may take one or more measurements of (e.g., observe) one or more objects within the environment 100. For example, the objects may be within a path of travel of the follower vehicle 104. It is noted herein the 3DPS may emit a series of electromagnetic beams at defined sensor azimuth and elevation angles, which may bounce from the objects and return to the 3DPS. The leader vehicle 102 may build a local occupancy map based on the measurements of the objects within the environment 100.

The follower vehicle 104 may not include the 3DPS. For example, the ability for select classes of the follower vehicle 104 may be dependent on a trade-off between size, weight, power, and cost (SWAP-C trade-off). It is noted herein, however, that the follower vehicle 104 may still require the data related to the occupancy map generated from measurements taken by the 3DPS for onboard cognitive decision-aiding (e.g., autonomy) applications. As such, the leader vehicle 102 may transmit data aggregated from the measurements taken by the 3DPS onboard the leader vehicle 102 via one or more datalinks (e.g., communication links). Once the data aggregated from the measurements is received from the leader vehicle 102, the follower vehicle 104 may adjust an intended path of travel 112 to avoid the objects within the environment 100.

Although embodiments of the present disclosure are directed to the follower vehicle 104 adjusting and/or otherwise altering the intended path of travel 112 to avoid the objects within the environment 100, it is noted herein that the leader vehicle 102 may adjust an intended path of travel to avoid the objects within the environment 100. Therefore, the above description should not be interpreted as a limitation on the present disclosure but merely an illustration.

In one example, as illustrated in FIG. 1, the 3DPS onboard a leader vehicle 102 may take one or more measurements 106a of an object 108a within the environment 100 at a time $t_0$.

At time $t_1$, the leader vehicle 102 may transmit updates to the local occupancy map of the follower vehicle 104 generated from the measurements 106a via the one or more datalinks 110a. In addition, at time $t_1$ the leader vehicle 102 may take one or more measurements 106b of (e.g., observe) an object 108b within the environment 100. It is noted herein, however, that the leader vehicle 102 may take one or more measurements 106b of (e.g., observe) an object 108b within the environment 100 before or after transmitting the updates to the local occupancy map of the follower vehicle 104 generated from the measurements 106a via the one or more datalinks 110a.

At time $t_2$, the leader vehicle 102 may transmit updates to the local occupancy map of the follower vehicle 104 generated from the measurements 106b to the follower vehicle 104 via the one or more datalinks 110b. Based on the received data aggregated from the measurements 106a of the object 108a and the received data aggregated from the measurements 106b of the object 108b, the follower vehicle 104 may adjust its path of travel 112 to avoid the object 108a and the object 108b.

It is noted herein that a follower vehicle 104 may not be able to wait for a large batch process to collect all 3DPS data from the leader vehicle 102 to generate one large occupancy map, such that the follower vehicle 104 may instead be required to rapidly respond to the 3DPS data from the leader vehicle 102 by updating its local occupancy map as the 3DPS data becomes available from the leader vehicle 102.

As such, it is noted herein that optimizing the transfer of data between the leader vehicle 102 and the follower vehicle 104 via the datalinks may include a trade-off between a number of factors including, but not limited to, the initializing of the follower vehicle 104 local occupancy map, the efficiency of the transmitting of the occupancy map updates from the leader vehicle 102 to the follower vehicle 104, and the ensuring of the synchronization between the leader vehicle 102 and the follower vehicle 104 occupancy maps.

The leader vehicle 102 and/or the follower vehicle 104 may be any type of vehicle known in the art. For example, the vehicle may be any air, land, or water-based personal equipment or vehicle; any air, land, or water-based commercial equipment or vehicle; any air, land, or water-based military equipment or vehicle known in the art. For instance, a leader vehicle 102 may include an aircraft with onboard 3DPS, while a follower vehicle 104 may include an unmanned aerial vehicle (UAV) or other aircraft without onboard 3DPS (e.g., due to SWAP-C constraints). Therefore, the above description should not be interpreted as a limitation on the present disclosure but merely an illustration.

Where the environment 100 includes an avionics environment (e.g., including a leader aircraft and a follower aircraft), it is noted herein the process of occupancy map synchronization in multi-vehicle networks may be configured in accordance with avionics guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio Incorporated (ARINC), or any other standards setting organization or company; the Radio Technical Commission for Aeronautics (RTCA) or any other guidelines agency or organization; or the like. Therefore, the above description should not be interpreted as a limitation on the present disclosure but merely an illustration.

Although embodiments of the present disclosure are directed to a single leader vehicle 102 and a single follower vehicle 104, it is noted herein that there may be multiple of either the leader vehicle 102 and/or the follower vehicle 104. For example, the environment 100 may include one leader vehicle 102 and multiple follower vehicles 104. For instance, the one leader vehicle 102 may be in communication with some or all of the multiple follower vehicles 104. By way of another example, the environment 100 may include multiple leader vehicles 102 and multiple follower vehicles 104. For instance, the multiple leader vehicles 102 may separately or simultaneously be in communication with some or all of the multiple follower vehicles 104. By way of another example, the environment 100 may include multiple leader vehicles 102 and one follower vehicle 104. For example, the multiple leader vehicles 102 may separately or simultaneously in communication with the one follower vehicle 104. It is noted herein that having multiple leader vehicles 102 and/or multiple follower vehicles 104 may require synchronization management between the respective vehicle types (e.g., maintaining a common set of 3DPS data collected by the multiple leader vehicles 102, or the like). Therefore, the above description should not be interpreted as a limitation on the present disclosure but merely an illustration.

Figure 2:
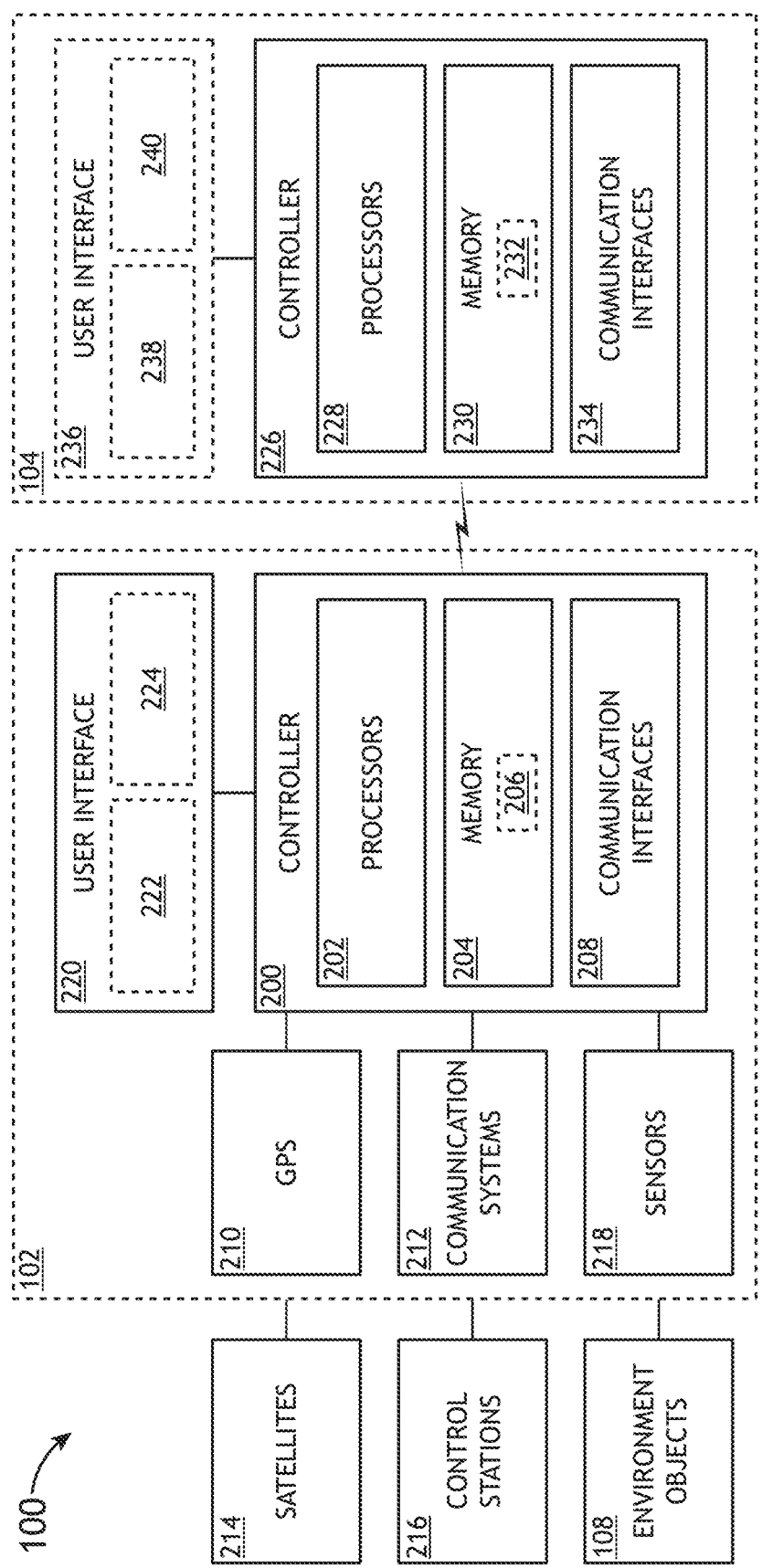
FIG. 2 is an example embodiment of a block diagram of an environment in which occupancy map synchronization in multi-vehicle networks may be implemented, in accordance with the inventive concepts disclosed herein.
Figure 3:
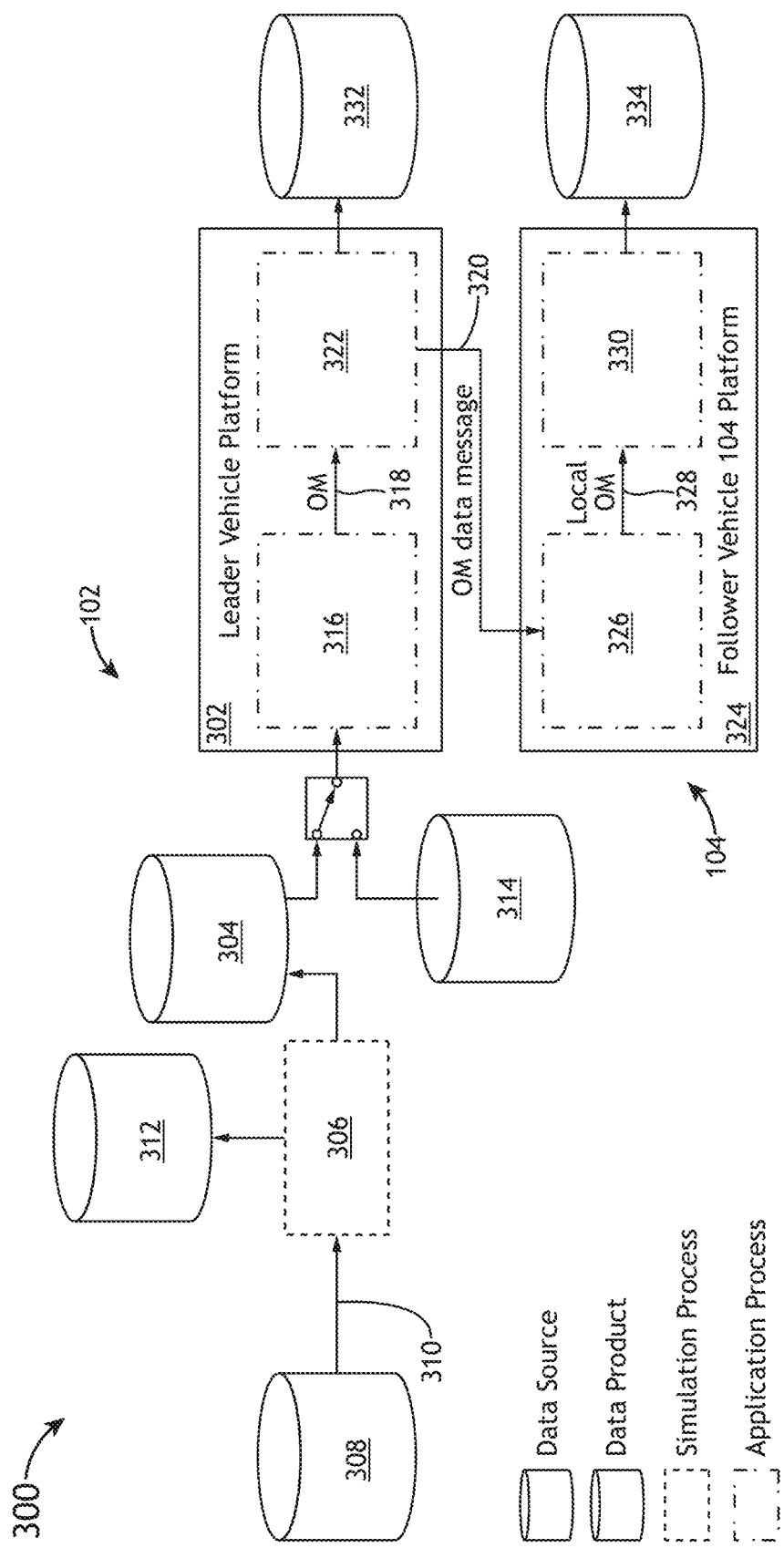
FIG. 3 is an example embodiment of a flow diagram for occupancy map synchronization in multi-vehicle networks, in accordance with the inventive concepts disclosed herein.

FIG. 2 illustrates an example embodiment of a block diagram of the environment 100 in which occupancy map synchronization in multi-vehicle networks may be implemented, in accordance with the inventive concepts disclosed herein.

The leader vehicle 102 may include one or more controllers 200. The controllers 200 may include one or more processors 202 and memory 204. The memory 204 may store one or more sets of program instructions 206. The controllers 200 may include one or more communication interfaces 208.

The leader vehicle 102 may include one or more global positioning system (GPS) devices 210 coupled to and/or in communication with the controllers 200. The leader vehicle 102 may include one or more communication subsystems 212 (e.g., transmitters, receivers, transceivers, or the like) coupled to and/or in communication with the controllers 200. For example, the communication subsystems 212 may include, but are not limited to, one or more processors, memory, and/or one or more antenna. The GPS devices 210 and/or the communication subsystems 212 may be in communication with one or more satellites 214. The communication subsystems 212 may be in communication with one or more control stations 216.

The leader vehicle 102 may include one or more sensors 218 (e.g., one or more three-dimensional perception sensors (3DPS)) coupled to and/or in communication with the controllers 200. As illustrated in FIG. 1, the sensors 218 may take one or more measurements (e.g., measurements 106) of one or more objects 108 within the environment 100.

The controllers 200 may be coupled to and/or in communication with one or more user interfaces 220. The user interfaces 220 may include one or more display devices 222. The user interfaces 220 may be coupled to one or more input devices 224.

The follower vehicle 104 may include one or more controllers 226. The controllers 226 may include one or more processors 228 and memory 230. The memory 230 may store one or more sets of program instructions 232. The controllers 226 may include one or more communication interfaces 234.

The controllers 226 may be coupled to and/or in communication with one or more user interfaces 236. The user interfaces 236 may include one or more display devices 238. The user interfaces 236 may be coupled to one or more input devices 240.

The controllers 200 and/or the controllers 226 may be a computer including, but not limited to, a desktop computer, a mainframe computer system, a workstation, an image computer, a parallel processor, a networked computer, or the like. The controllers 200 and/or the controllers 226 may be a personal electronic device. For example, the personal electronic device may include a handheld computer such as, but not limited to, a smartphone, a tablet, a phablet, or the like. By way of another example, the personal electronic device may include a laptop computer such as, but not limited to, a laptop with a single-fold hinge, a laptop with a double-fold hinge, a laptop with a twist-and-fold hinge, a laptop with a detachable display device and/or a detachable user input device, or the like.

The processors 202, 228 may include any one or more processing elements known in the art. In this sense, the processors 202, 228 may include any microprocessor device configured to execute algorithms and/or program instructions. In general, the term "processor" may be broadly defined to encompass any device having one or more processing elements, which execute a set of program instructions from a non-transitory memory medium (e.g., the memory 204, 230), where the sets of program instructions 206, 232 are configured to cause the one or more processors 202, 228 to carry out any of one or more process steps.

The memory 204, 230 may include any storage medium known in the art suitable for storing the one or more sets of program instructions 206, 232 executable by the associated one or more processors 202, 228. For example, the memory 204, 230 may include a non-transitory memory medium. For instance, the memory 204, 230 may include, but is not limited to, a read-only memory (ROM), a random access memory (RAM), a magnetic or optical memory device (e.g., disk), a magnetic tape, a solid state drive, and the like. The memory 204, 230 may be configured to provide display information to the display device (e.g., display devices 222, 238). In addition, the memory 204, 230 may be configured to store user input information from a user input device (e.g., input devices 224, 240). The memory 204, 230 may be housed in a common controller housing with the one or more processors 202, 228. The memory 204, 230 may, alternatively or in addition, be located remotely with respect to the spatial location of the processors 202, 228 and/or the controllers 200, 226. For instance, the one or more processors 202, 228 and/or the controllers 200, 226 may access a remote memory 204, 230 (e.g., server), accessible through a network (e.g., internet, intranet, and the like) via the one or more communication interfaces 208, 234.

The controllers 200, 226 may be configured to receive and/or acquire data or information from other systems or tools via the one or more communication interfaces 208, 234 that may include wireline and/or wireless portions. In addition, the controllers 200, 226 may be configured to transmit data or information (e.g., the output of one or more procedures of the inventive concepts disclosed herein) to one or more systems or tools via the one or more communication interfaces 208, 234 that may include wireline and/or wireless portions. In this regard, the transmission medium may serve as a data link between the controllers 200, 226 and other subsystems. In addition, the controllers 200, 226 may be configured to send data to external systems via a transmission medium (e.g., network connection).

The one or more display devices 222, 238 may include any display device known in the art. For example, the one or more display devices 222, 238 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more input devices 224, 240 may include any user input device known in the art. For example, the one or more input devices 224, 240 may include, but are not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the one or more display devices 222, 238 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the input devices 224, 240 may include, but is not limited to, a bezel mounted interface.

Although embodiments of the present disclosure are directed to the one or more display devices 222, 238 being housed with the one or more input devices 224, 240 in a common user interface housing, it is noted herein the one or more display devices 222, 238 may be separate from the one or more input devices 224, 240. Therefore, the above description should not be interpreted as a limitation on the present disclosure but merely an illustration.

FIGS. 3-11B generally illustrate a system 300 for occupancy map synchronization in multi-vehicle networks, in accordance with the inventive concepts disclosed herein.

It is noted herein that the system 300 may include select data transmission criteria including, but not limited to, performance criteria (e.g., latency, resolution, ground speed, separation time, or the like) and platform criteria (e.g., memory, processing, bandwidth, or the like).

The system 300 may include a leader platform 302 of the leader vehicle 102. The leader platform 302 may receive a point cloud data (PCD) file 304 from a 3DPS data generator 306 (or data generation process 306). The PCD file 304 may include 3PDS data (e.g., LIDAR, navigation data, or the like) for the leader vehicle 102.

The 3DPS data combiner 306 may receive one or more data inputs including, but not limited to, a lead flight trajectory definition 308 (e.g., which includes a leader vehicle 102 true navigation state 310) saved to file and/or a terrain model database 312 saved to file. It is noted herein, however, that the leader platform 302 may receive a previously-stored or previously-recorded PCD file 314 in the alternative to receiving the PCD file 304 from the 3DPS data combiner 306. Therefore, the above description should not be interpreted as a limitation on the present disclosure but merely an illustration.

The 3DPS data combiner 306 and the leader vehicle platform 302 may be components of the leader vehicle 102. It is noted herein, however, that the 3DPS data combiner 306 may be offboard the leader vehicle 102, and instead installed on a third-party component (e.g., a server) and configured to transmit the PCD file 304 to the leader vehicle platform 302. Therefore, the above description should not be interpreted as a limitation on the present disclosure but merely an illustration.

A three-dimensional (3D) point cloud may be computed by the 3PDS data combiner 306 combining the endpoints of the electromagnetic beams generated by the 3DPS with the positions and/or locations of the 3DPS relative to a common mapping frame. Each point within the 3D point cloud may explicitly indicate that a particular volume element (voxel) is occupied, while the 3D point cloud along with knowledge of the 3DPS viewpoints may offer implicit evidence of free space (e.g., the beam was not reflected earlier along the transmission path, implying that voxels within the transmission path prior to an observed object 108 are more likely to be free). In this regard, the occupancy map 318 may provide a probabilistic representation of occupied, unknown or free voxels at a select resolution.

Figure 4:
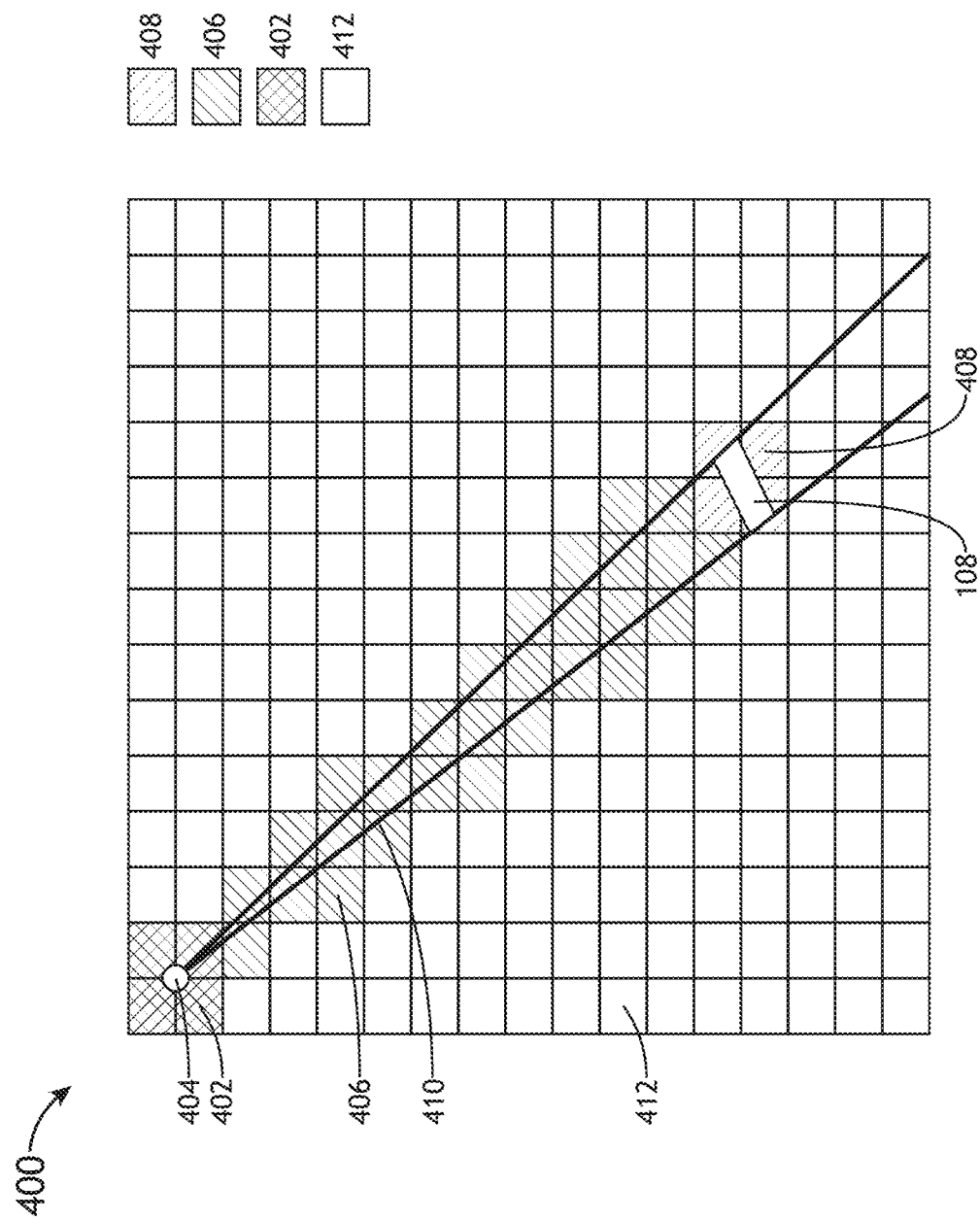
FIG. 4 is an example embodiment of a three-dimensional point cloud, in accordance with the inventive concepts disclosed herein.

FIG. 4 illustrates an example embodiment of a 3D point cloud 400, in accordance with the inventive concepts disclosed herein. The point cloud 400 may include known voxels 402 near the leader vehicle 102 including three-dimensional perception sensors (3DPS) 404. The 3DPS 404 may emit electromagnetic beams 406 of a select width at an environment object 108. Voxels 408 surrounding the environment object 108 may provide explicit evidence of occupancy, based on a detected reflection of the electromagnetic beams 406. Voxels 410 surrounding the electromagnetic beams may provide implicit evidence of free space because the electromagnetic beams did not get reflected prior to the observed object 108. Voxels 412 may represent space where the probability of occupation is unknown, as the electromagnetic beams 406 did not pass through the voxels 412. It is noted herein that the voxels 408, 410, 412 may each be utilized in determining the probability of occupation.

Figure 5A:
FIG. 5A is an example embodiment of a three-dimensional point cloud determined from three-dimensional perception sensor (3DPS) data, in accordance with the inventive concepts disclosed herein.
Figure 5B:
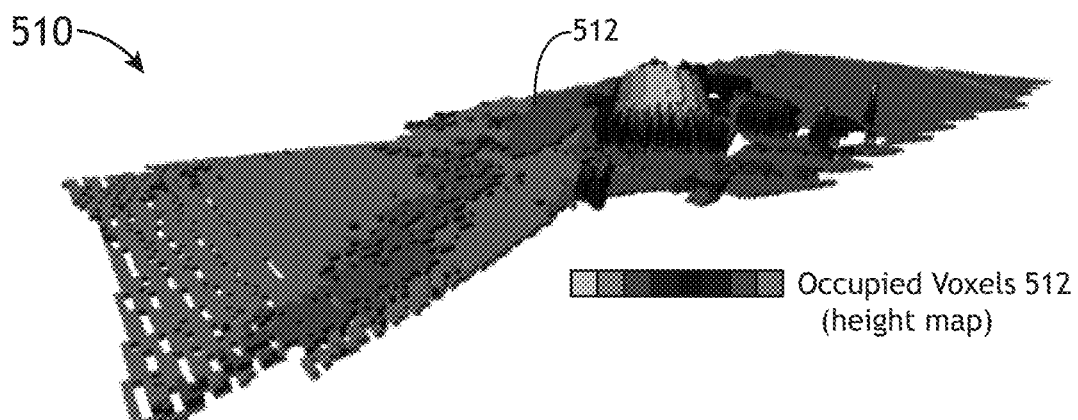
FIG. 5B is an example embodiment of a three-dimensional world model (3DWM) of occupied volume elements (voxels) determined from three-dimensional perception sensor (3DPS) data, in accordance with the inventive concepts disclosed herein.
Figure 5C:
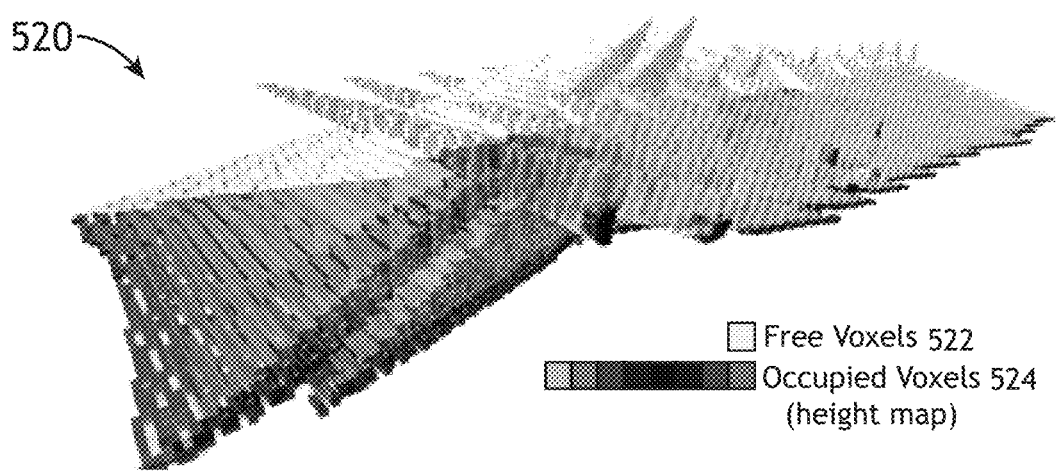
FIG. 5C is an example embodiment of a three-dimensional world model (3DWM) of occupied and free volume elements (voxels) determined from three-dimensional perception sensor (3DPS) data, in accordance with the inventive concepts disclosed herein.

FIGS. 5A-5C illustrate example embodiments of graphical representations of select 3DPS data, in accordance with the inventive concepts disclosed herein. FIG. 5A illustrates a 3D point cloud 500 including 3DPS data 502. In contrast to a 3D point cloud, an occupancy map may explicitly represent free, occupied, and unknown voxels and may provide a probabilistic framework for risk-based decision making under redundant circumstances. FIG. 5B illustrates a three-dimensional world model (3DWM) 510 with a select resolution of occupied voxels 512 having a select height. For instance, the graph 510 is at a one-meter resolution. By way of another example, FIG. 5C illustrates a 3DWM 520 with a select resolution of unoccupied or free voxels 522 and occupied voxels 524 having a select height. For instance, the graph 520 is at a one-meter resolution.

It is noted herein that the information provided within the graphical representation 520 (e.g., as illustrated in FIG. 5C), applications onboard the leader platform 302 may understand (e.g., in terms of probability) where it is safe to fly (e.g., free space) or unsafe to fly (e.g., unknown or occupied space).

stored as a floating-point number. Where the voxel or node of the octree is a parent to children voxels or nodes, the parent voxel or node may additionally include information about the children voxels or nodes including a child pointer and a node array for the children. Where the voxel or node of the octree is a leaf voxel or node (e.g., has no children voxels or nodes), the leaf voxel or node may include a null child pointer and a non-allocated node array for the children. A comparison between parent and leaf voxels or nodes for 32-bit and 64-bit architecture is illustrated in Table 1.

TABLE 1

| Node Type | 32-bit Architecture | | 64-bit Architecture | |
|---|---|---|---|---|
| Parent | float probability + | 4 bytes | float probability + | 4 bytes |
| | child pointer + | 4 bytes | child pointer + | 8 bytes |
| | node array = | 8*4 bytes | node array = | 8*8 bytes |
| | Total | 40 bytes | Total | 76 bytes |
| Leaf | float probability + | 4 bytes | float probability + | 4 bytes |
| | child pointer + | 4 bytes | child pointer + | 8 bytes |
| | Total | 8 bytes | Total | 12 bytes (may be rounded to 16) |

Referring back to FIG. 3, the leader platform 302 may read data into an occupancy map (OM) update application process 316 from the simulated PCD file 304 at the sample rate of the 3DPS (e.g., during steady-state operation). The read-in data may be implemented by the OM update application process 316, which may generate a three-dimension world model (3DWM) represented by an occupancy map (OM) 318 or perform a measurement update to an occupancy map (OM) probability of a voxel representing a select portion of the environment 100 being occupied. For example, the occupancy map 318 may be generated by an insertPointCloud( ) method of OctoMap (e.g., an Open-Source software).

The occupancy map 318 may be converted into a binary tree and packed into an occupancy map (OM) data message 320. For example, the binary tree may be an octree (e.g., a hierarchical storage mechanism based on the number eight), where each node or voxel of the octree may carry information (e.g., binary occupancy information including occupied or free) about the probability of occupancy for the voxel of space it represents, where the probability is based on results from the 3DPS of the leader vehicle 102. It is noted herein the definition of binary tree, here, is different from a definition of "binary tree," where each node has two children. In addition, it is noted herein that "voxel" and "node" may be used interchangeably in the context of an octree throughout the present disclosure.

A top voxel or node of the octree (e.g., a root) may have a known position in the three-dimensional world (e.g., a geocentric, geodetic, north-east-up (NEU) coordinates, or the like) and a select size of the sides of the voxels (e.g., a select height, width, and depth). It is noted herein, however, that the hierarchical storage mechanism of the octree (e.g., decomposing by a power of two) allows for the implicit knowledge with respect to the location and size of any children to a parent voxel or node, thus removing the need of every node within the octree to carry a position value. In this regard, memory usage may be reduced (in some cases, significantly).

A voxel or node of the octree may include data about the probability of occupancy. For example, the data may be It is noted herein the arrangement for the parent and leaf nodes as provided in Table 1 may provide a number of advantages for reducing memory allocation. For example, the same data type may be used for both parent and leaf nodes. By way of another example, the octree may only define the voxels or nodes needed to represent the data of the occupancy map 318, such that memory is not consumed for voxels or nodes where measurement updates have not yet been performed (due to the implication of the unknown status of the voxel or node).

FIG. 6 illustrates an octree cube 600 for a select voxel, according to the inventive concepts disclosed herein. The octree cube 600 may include one or more voxels, where each voxel may be at a particular resolution. For example, the octree cube 600 may represent a single voxel with an edge length representing a first resolution $r_1$. By way of another example, the octree cube 600 may be a parent voxel divided into eight children or sub-cubes, where each sub-cube has an edge length representing a second resolution $r_2$. By way of another example, each of the eight sub-cubes may be a parent voxel divided into eight children or sub-cubes (e.g., for a total of sixty-four cubes), where each sub-cube has an edge length representing a third resolution $r_3$. Each voxel within the octree cube 600 may be indicative of an occupied probability corresponding to a free voxel 602, an occupied voxel 604, or an unknown voxel 606.

FIG. 7 illustrates an octree data structure 700, according to the inventive concepts disclosed herein. The octree data structure 700 may include one or more tree nodes, where each tree node may represent a single node at a particular resolution. For example, the octree data structure 700 may represent a single node with an edge length representing a first resolution $r_1$. By way of another example, the octree data structure 700 may include a parent node divided into eight children or sub-nodes, where each sub-node has an edge length representing a second resolution $r_2$. By way of another example, each of the eight sub-nodes may be a parent node divided into eight children or sub-nodes (e.g., for a total of sixty-four nodes), where each sub-node has an edge length representing a third resolution $r_3$. Each node within the octree data structure 700 may be indicative of an occupied probability corresponding to a node represented by a free node 702, an occupied node 704, an unknown node 706, or a mixed node 708. For example, occupancy information for a mixed node 708 may summarize occupancy of its children nodes. It is noted herein the unknown nodes 706 may not be stored in memory.

It is noted herein that the resolutions $r_1$, $r_2$, $r_3$ may be scaled or proportional to one another. For example, $r_1$ may be four meters, $r_2$ may be two meters, and $r_3$ may be one meter. By way of another example, $r_1$ may be one meter, $r_2$ may be one-half meter, and $r_3$ may be one-quarter meter. In addition, it is noted herein that the octree cube 600 and/or the octree data structure 700 is not limited to three resolutions $r_1$, $r_2$, $r_3$. For example, where an occupancy map 318 is 4,096 by 4,096 square meters with a one-meter maximum resolution, the octree cube 600 and/or the octree data structure 700 may include up to twelve parent layers (e.g., for a total of thirteen layers, including the final children layer).

Figure 11A:
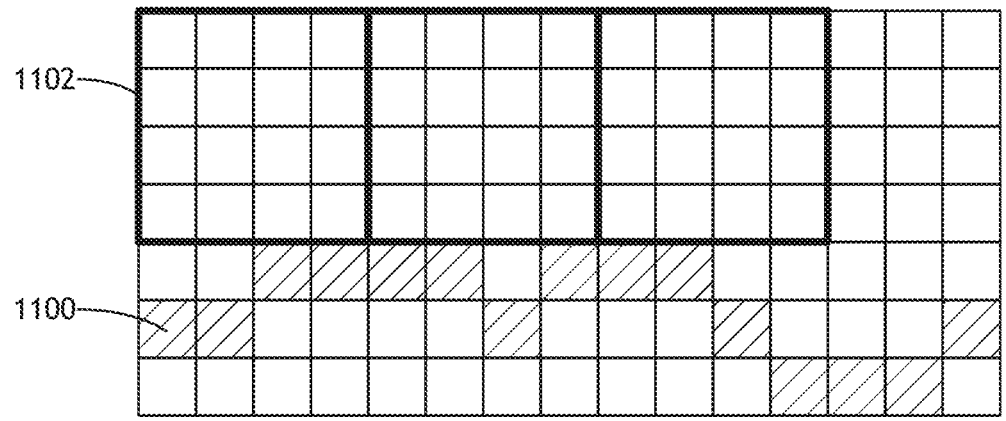
FIG. 11A illustrates a free-occupied boundary region of an occupancy map, according to the inventive concepts disclosed herein.
Figure 11B:
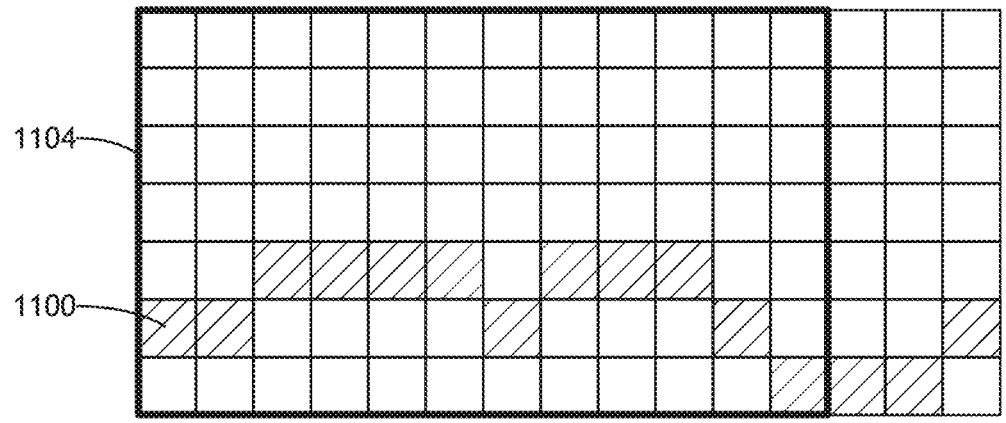
FIG. 11B illustrates a free-occupied boundary region of an occupancy map, according to the inventive concepts disclosed herein.

It is noted herein that only a portion of the octree cube 600 or octree data structure 700 may be divided into cubes with finer (e.g., more detailed) resolutions, such that the voxels 602, 604, 606 and/or nodes 702, 704, 706, 708 may or may not have children or sub-voxels. For example, if a parent voxel or node having the same probability as all of its children, the occupancy may be stored in the parent voxel or node only without any loss of information (e.g., the children are unallocated and subsequently "pruned"). It is noted herein that pruning may include removing known free or unallocated space outside of (e.g., a select number of voxels beyond) an occupied voxel/free voxel boundary or an unknown voxel/free voxel boundary. It is noted herein that examples of boundaries are illustrated in FIGS. 11A and 11B.

In addition, it is noted herein that the size of an octree cube 600 or data structure 700 may be dependent on the resolution of the occupancy map 318. The occupancy map 318 may be initially determined at the finest resolution, though at the expense of memory allocation and/or memory usage. As such, customizing the parent and leaf data types may result in reduced memory usage. For example, nodes or voxels may be written sequentially, which may eliminate the need for large pointers. By way of another example, only an occupancy state or a coarse occupancy probability estimate may be needed, which may allow the floating-point occupancy data to be replaced by only a few bits.

FIGS. 8A-8D illustrate example embodiments of graphical representations of select 3DPS data, in accordance with the inventive concepts disclosed herein.

As illustrated in FIG. 8A, an occupancy map 318 with a wide field of view (FOV) including a landing zone (LZ) 800 may be initially populated with voxels 802 generated based on coarse terrain data provided by 3DPS at a lower resolution (e.g., four-meter resolution). For example, the leader vehicle 102 may be some distance from a landing zone 800, such that a coarse resolution is adequate while allowing for fast data transmission and path planner processing with the follower vehicle 104.

The occupancy map 318 may be updated with voxels 804 generated based on additional terrain data provided by 3DPS at a higher resolution (e.g., one-meter resolution). For example, as illustrated in FIG. 8B, the occupancy map 318 may include the wide FOV. By way of another example, as illustrated in FIG. 8C, the occupancy map 318 may include a narrow FOV surrounding the landing zone 800.

As illustrated in FIG. 8D, the occupancy map 318 with the narrow FOV may be updated with voxels 806 generated based on additional terrain data provided by 3DPS at an even higher resolution (e.g., one-quarter-meter resolution).

Before reaching the landing zone 800, a follower vehicle 104 may receive either a landing zone assessment for the proposed landing zone 800 and/or at least a portion of the even higher resolution occupancy map 318. It is noted herein that providing the follower vehicle 104 the occupancy map 318 via a query scheduler that determines a required occupancy map (OM) resolution over a period of time, instead of as a whole, may ensure data is available when needed while avoiding excessive bandwidth/processing requirements.

Referring again to FIG. 3, the leader platform 302 may pack the occupancy map 318 into the data message 320 via a message packing and transmitting application process 322. The packed occupancy map 318 may be transmitted to a follower platform 324 on the follower vehicle 104 via the data message 320. The messaging time and messaging size of the data message 320 may affect the speed with which the follower vehicle 104 may respond to environment objects 108 observed by the leader vehicle 102.

The messaging time of the data message 320 may depend on one or more of required node transmission rate, node message size, and/or available datalink bandwidth.

The follower vehicle 104 may not require the maximum resolution occupancy map 318 until within a select distance (e.g., from a landing zone approach path). The node scan rate for a terrain surface area dA/dt is represented in EQ. 1, where L is a leading-edge width determined based on a necessary resolution and dx/dt is an approach speed for the follower vehicle 104.

$$dA/dt = L*dx/dt \qquad \text{EQ. 1}$$

It is noted herein that if the node transmission rate utilizes a steady-state operation (e.g., operation without buffering), then the node scan rate is approximately equal to node transmission rate for the leader vehicle 102.

The occupancy map 318 may include one or more root nodes. Where the occupancy map 318 is broken down into an octree data structure, each parent node within the octree data structure may have at most eight children, such that each node may be represented by three bits. FIG. 9 illustrates an octree data structure 900 for a select voxel with corresponding binary bit code, according to the inventive concepts herein. The node message size (in bits) for each's node position relative to a root node is represented in EQ. 2, where N is the number of levels from root to child depth, a select number of additional bits P are reserved for occupied versus free designation, and a select number of additional bits M are reserved for storing additional information.

$$\text{node message size} = (3*N) + P + M \qquad \text{EQ. 2}$$

As such, the bandwidth requirement (BR) (e.g., in Megabits per second (Mbps)) for the messaging time of the data message 320 is represented in EQ. 3.

bandwidth requirement (BR)=(node transmission rate)(node message size)

$$BR = (L*dx/dt)*[(3*N) + P + M] \qquad \text{EQ. 3}$$

Reducing the minimum node size (e.g., increasing maximum resolution) may cause an increase in the number of levels to an octree data structure. For example, exponential trends for increasing the maximum resolution as the number of levels increase, as the possible number of nodes in the N level of an octree data structure is $8^N$.

The messaging time of the data message 320 may include some amount of latency, where latency is caused by one or more of ping, queuing delay (e.g., the time required to buffer the occupancy map data used to populate the message) and/or bandwidth delay (e.g., delay due to bandwidth limitations. Where nodes are sent one or a few at a time, queuing delay may be negligible. It is noted herein, however, that free space may greatly increase the possibility for bandwidth delay. Improvements to decrease the amount of free space to reduce bandwidth delay may cause an increase in queuing delay. As such, there may be a trade-off between bandwidth delay and queuing delay.

The messaging size of the data message 320 may depend on one or more of node data size, extent of the occupancy map, maximum resolution of the occupancy map, and number of children nodes allocated for each parent node.

The data size for an octree (or memTree) of an occupancy map 318 may be represented by EQ. 4, where, N is the number of levels from root to child depth, a select number of additional bits P are reserved for occupied versus free designation, and a select number of additional bits M are reserved for storing additional information, nLeafs is the number of allocated leafs at a particular level, and nParents is the number of parents in the octree.

$$\text{memTree}=8 \text{ bytes}*n\text{Leafs}+([(3*N)+P+M] \text{ bytes})* n\text{Parents} \qquad \text{EQ. 4}$$

An alternative to octree representation may include grid representation of the occupancy map 318. It is noted herein, however, that the octree data structure may include additional overhead with pointers to create a sparser representation requiring lower data usage and/or data allocation than the data usage and/or data allocation necessary for grid representation. Where the 3DPS data is not fully-allocated, the non-allocated children may be pruned and the messaging size of the data message 320 may be reduced considerably, resulting in the octree data structure being a more efficient method of transferring data between the leader vehicle 102 and the follower vehicle 104 than grid representation.

Although octree representation of the occupancy map 318 is believed to be an improvement on current processes known in the art (e.g., grid representation), additional improvements may be implemented for the data usage and/or data allocation necessary for octree representation of the occupancy map 318. One improvement to data usage and/or data allocation may include implementing parallel processing. Another improvement to data usage and/or data allocation may include avoiding any redundant ancestry information with a select message format when multiple nodes with common ancestors are sent simultaneously.

Sub-trees, or trees with all nodes within a common parent node having a select number of common ancestors, may provide additional savings in terms of data usage when only a limited region of interest of a particular environment is initially needed. FIG. 10A illustrates a sub-tree data structure 1000 for a select voxel with corresponding binary bit code, according to the inventive concepts herein. As illustrated in FIG. 10A, the sub-tree data structure 1000 may include free nodes 1002, occupied nodes 1004, unknown nodes 1006, and/or mixed nodes 1008. It is noted herein the unknown nodes 1006 may not be stored in memory.

Delta-trees, or trees of any node that have changed/been updated and share a common ancestry, may provide additional savings in terms of data usage. It is noted herein that delta-trees may avoid duplicate parent node information and allow for pruning. FIG. 10B illustrates a delta-tree data structure 1010 for a select voxel with corresponding binary bit code, according to the inventive concepts herein. As illustrated in FIG. 10B, the delta-tree data structure 1010 may include new free nodes 1012, and new occupied nodes 1014.

Table 2 outlines example reductions of data usage necessary to transmit sub-trees and delta trees, respectively.

TABLE 2

| Tree by Node | | Tree by Sub-tree (parent node: 000) | | Tree by Delta-tree | |
| --- | --- | --- | --- | --- | --- |
| 000-001 | 1 | 001 | 1 | Parent | 100 | 0 |
| 000-010 | 0 | 010 | 0 | node: | | |
| 000-011 | 0 | 011 | 0 | root | | |
| 000-100 | 1 | 100 | 1 | Parent | 000 | 1 |
| 000-101 | 0 | 101 | 0 | node: | 101 | 1 |
| | | | | 000 | 110 | 0 |
| | | | | | 111 | 0 |
| Total | 35 bits | Total | 23 bits | Total | | 19/22 bits |

It is noted herein that the child nodes may be quantized to a binary bit. For example, as illustrated in FIG. 10A/10B and Table 2, a free node may be represented by a 0 while an occupied node may be represented by a 1. In this regard, each particular child node may be quantized to a single-bit value.

Another improvement to data usage and/or data allocation may include improving free-space efficiency in boundary regions between occupied voxels and free voxels via a compact free space representation. FIGS. 11A and 11B illustrate a free-occupied boundary region 1100 of an occupancy map 318, according to the inventive concepts herein. In one example, as illustrated in FIG. 11A, free space above the free-occupied boundary region 1100 may be represented by large voxels 1102. In another example, as illustrated in FIG. 11B, a voxel 1104 is selected such that free space is implied by knowing the free-occupied boundary region 1100. It is noted herein that free-space efficiency may be dependent on the resolution of the occupancy map 318 (e.g., lower-resolution occupancy maps may include less free-space).

Although the examples in the present disclosure are directed to a single parent node, it is noted herein that the occupancy map 318 may include multiple parent nodes. It is noted herein that spikes in message time and/or message size of the data message 320 may be observed at the instance where a scan pattern enters a new parent node, which may require the expanding of a greater number of nodes. As such, another improvement to data usage and/or data allocation may include holding some nodes for the next data message 320 when the spike occurs. In addition, another improvement to data usage and/or data allocation may include pre-allocating select high-level nodes around the current scan area, especially in the direction of travel. Further, another improvement to data usage and/or data allocation may include load-leveling changed nodes per second to significantly reduce overall peak loading of the system 300, as message size, encode time, and follower update time are all driven by the number of changed nodes. It is noted herein this may also reduce overall system 300 requirements, as the system 300 could be designed for average loading rather than for peak loading.

Referring again to FIG. 3, the follower platform 324 may receive and unpack the transmitted OM data message 320 via a message reception and unpacking application process 326 to generate a local occupancy map 328. The follower platform 324 may apply the local occupancy map 328 via an occupancy map (OM) measurement update application process 330 to initialize (e.g., during a FULL message event chain) or update (e.g., during an UPDATE message event chain) a local occupancy map 328 utilized by the follower vehicle 104.

A full occupancy map 318 may be packed into the OM data message 320 during a FULL message event chain. For example, the FULL message event chain may be triggered periodically to allow a follower vehicle 104 to initialize or reset its local occupancy map 328 (e.g., write a received occupancy map 318 to memory). The FULL message event chain may include an INIT message, which may define one or more properties of an octree data structure representing the occupancy map 318 (e.g., root noted position, resolution, number of nodes, or the like). A FULL message may follow the INIT message, which may contain a copy of the octree data structure generated by the leader vehicle 102.

It is noted herein the FULL message may not be a full copy, but may instead be a partial copy generated following a pruning of the full octree data structure generated by the leader vehicle 102. It is noted herein that, as 3DPS data is continued to be collected and the occupancy map 318 subsequently continues to grow, the FULL message may initially include a sub-tree (e.g., as illustrated in FIG. 10A) or an octree including a coarser resolution, where following UPDATE messages may increase the extent of the local occupancy map 328 on the follower vehicle 104 and/or resolutions of select portions of the local occupancy map 328 stored on the follower vehicle 104.

A partial occupancy map 318 (e.g., one including only updated occupied or free voxels) may be packed into the data message 320 during an UPDATE message event chain. For example, the UPDATE message event chain may be triggered periodically to allow a follower vehicle 104 to update its local occupancy map 328 (e.g., write updates to its local occupancy map 328 to memory) to match the occupancy map 318 stored on the leader vehicle 102. After transmitting the FULL message, the leader platform 302 resets may change direction. For example, nodes that have changed state since the last change detection reset may be flagged within OctoMap. Periodically (e.g., 1 Hertz (Hz) frequency rate, or the like), the leader platform 302 may generate an UPDATE message by querying any changed nodes to add to a delta-tree (e.g., as illustrated in FIG. 10B) and pruning away the unchanged occupancy map 318.

It is noted herein that sending the UPDATE message less frequently may allow for more nodes with common ancestors and more pruning, which may reduce message size. However, this may require more complex processing, increasing the encode time of the data message 320. As such, improvements to increasing the interval between messages may result in a decrease in message size but an increase in processing time. However, improvements to decreasing the processing time may result in an increase in update frequency and an increase in latency, which may affect timing allocation.

The OM measurement update application process 330 may query data from the local occupancy map 328 at a select resolution for a select input in a cognitive decision-aiding (e.g., autonomy) application. For example, the application may adjust the path of travel of the follower vehicle 104 (e.g., via adjusting of one or more operational parameters of one or more components of the follower vehicle 104) based on the local occupancy map 328. For instance, the local occupancy map 328 may be applied in manned operation to provide operator cueing in a degraded visual environment (DVE). In addition, the local occupancy map 328 may be applied to closed-loop guidance of autonomous vehicles in unknown environments without the need for remote operating over a communication link.

Although embodiments of the present disclosure are directed to the follower vehicle 104 adjusting the intended path of travel 112 to avoid the objects within the environment 100 based on the local occupancy map 328, it is noted herein that the leader vehicle 102 may adjust and/or otherwise alter an intended path of travel to avoid the objects within the environment 100 based on the occupancy map 318. Therefore, the above description should not be interpreted as a limitation on the present disclosure but merely an illustration.

The leader platform 302 and/or the follower platform 324 may output a leader data packet 332 and/or a follower data packet 334, respectively, including log performance data and a corresponding data structure for analysis.

In this regard, efficient multi-resolution processes and data sharing may be implemented to obtain desired resolution levels at select areas of interest (e.g., areas requiring near-term planning) without incurring additional processing delays, thus optimizing the trade-off between resolution and data packet size.

Figure 12:
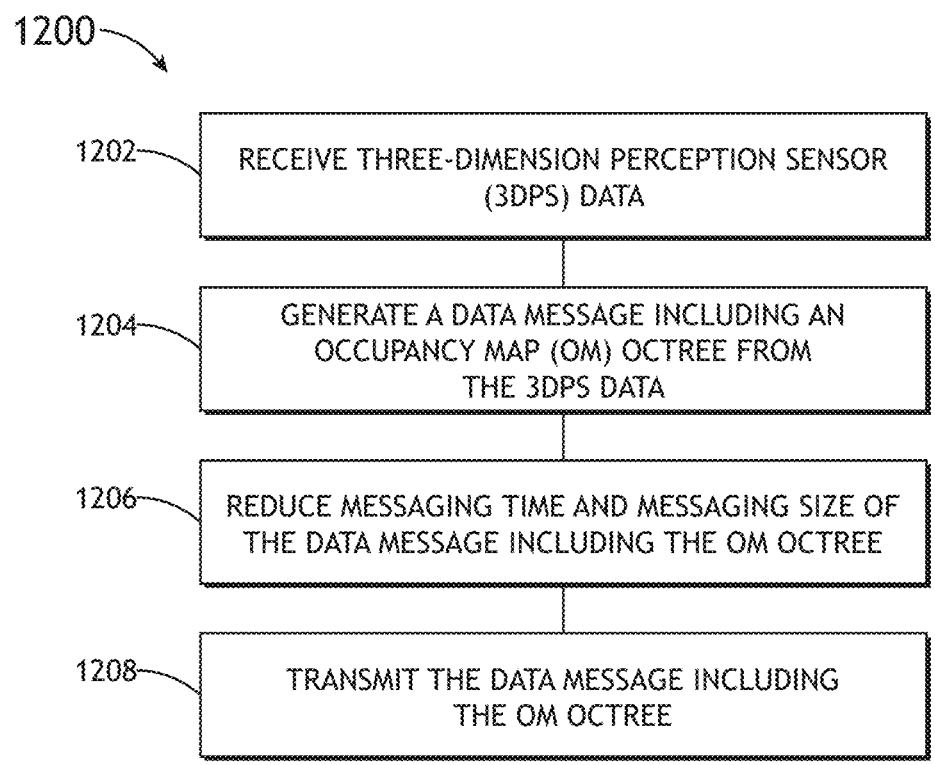
FIG. 12 is a flowchart of an exemplary method for occupancy map synchronization in multi-vehicle networks, in accordance with the inventive concepts disclosed herein.
Figure 13:
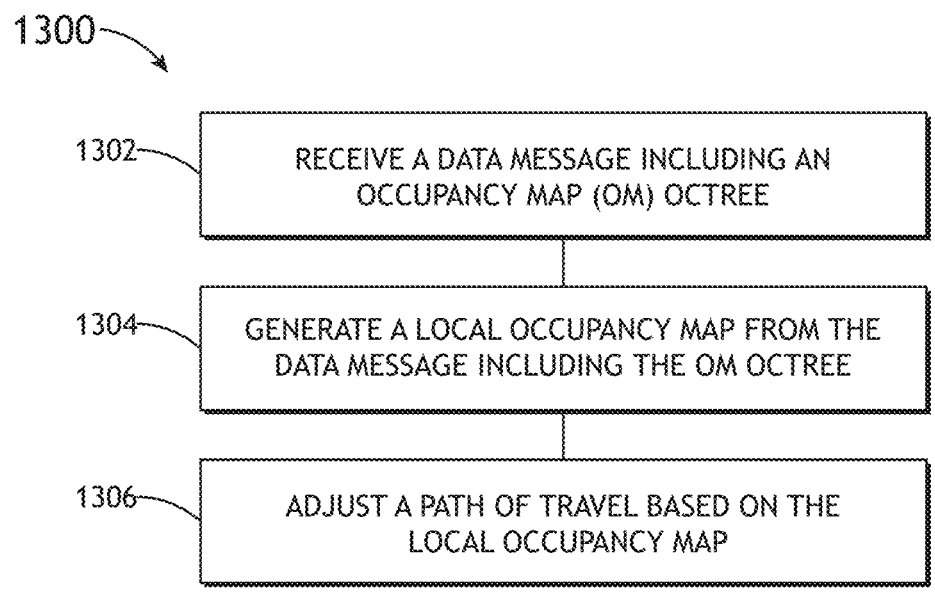
FIG. 13 is a flowchart of an exemplary method for occupancy map synchronization in multi-vehicle networks, in accordance with the inventive concepts disclosed herein.

FIGS. 12 and 13 generally illustrate methods for occupancy map synchronization in multi-vehicle networks, in accordance with the inventive concepts disclosed herein.

FIG. 12 illustrates a method 1200 for occupancy map synchronization in multi-vehicle networks, in accordance with the inventive concepts disclosed herein. In one example, the method 1200 may be implemented by the controller 200 of the leader vehicle 102 (e.g., as illustrated in FIG. 2).

A step 1202 may include receiving three-dimension perception sensor (3DPS) data. The 3DPS data may be generated from measurements taken of environment objects 104 by the sensors 218 of the leader vehicle 102.

A step 1204 may include generating a data message including an occupancy map (OM) octree from the 3DPS data. The 3DPS data may be converted into a three-dimensional world model (3DWM). The 3DWM may be converted into an OM octree data structure, where a voxel or node may be represented by a three-bit value. The data message may be a FULL message or an UPDATE message. The OM octree data structure may be constructed from 3DPS data having multiple resolutions to reduce the maximum tree depth (e.g., maximum number of levels) to a particular size for a particular scenario.

A step 1206 may include reducing messaging time and messaging size of the data message including the OM octree. The messaging time may include one or more of an encoding time or a transmission time (e.g., in seconds). The messaging size may include a data packet size (e.g., in bits or bytes). OM octree change detection may be incorporated to determine the minimal information content that must be sent to a follower vehicle. One or more sub-trees (e.g., if a FULL message) and/or one or more delta-trees (e.g., if an UPDATE message) may be constructed to efficiently transmit sparse 3DWM information to the follower vehicle. The occupancy values for the sub-trees and/or the delta-trees may be quantized to a particular resolution for the follower vehicle (e.g., the occupancy values may be converted to one-bit representing occupied/not occupied). Pruning may be applied to the sub-trees and/or the delta-trees of the OM octree.

A step 1208 may include transmitting the data message including the OM octree. The OM octree may be packed into a data message. The data message including the OM octree may be transmitted to a follower vehicle.

FIG. 13 illustrates a method 1300 for occupancy map synchronization in multi-vehicle networks, in accordance with the inventive concepts disclosed herein. In one example, the method 1300 may be implemented by the controller 226 of the follower vehicle 104 (e.g., as illustrated in FIG. 2).

A step 1302 may include receiving a data message including an occupancy map (OM) octree. The data message including the OM octree may be generated via one or more steps of the method 1200 (e.g., as illustrated in FIG. 12). The data message including the OM octree may be transmitted by a leader vehicle.

A step 1304 may include generating a local occupancy map from the data message including the OM octree. The follower vehicle map may create the local occupancy map 328 (e.g., when the data message is a FULL message) or update the local occupancy map 328 (e.g., when the data message is an UPDATE message).

A step 1306 may include adjusting a path of travel based on the generated local occupancy map. The path of travel may be adjusted to avoid environment objects included in the local occupancy map.

It is noted herein the methods 1200 and 1300 are not limited to the steps provided. For example, the methods 1200 and 1300 may instead include more or fewer steps. By way of another example, the methods 1200 and 1300 may perform the steps in an order other than provided. Therefore, the above description should not be interpreted as a limitation on the scope of the present disclosure, but merely an illustration.

As will be appreciated from the above embodiments, the inventive concepts disclosed herein are directed to occupancy map synchronization in multi-vehicle networks, where three-dimensional world model (3DWM) data is aggregated into occupancy map (OM) octrees prior to being transmitted from a leader vehicle to a follower vehicle.

Specifically, inventive concepts disclosed herein are directed to representing the 3DWM using an OM octree. In addition, inventive concepts disclosed herein are directed to representing the node position of a volume element (voxel) of an OM octree relative to its parent as a three-bit value. Further, inventive concepts disclosed herein are directed to incorporating OM octree change detection to determine the minimal information content to be sent. Further, inventive concepts disclosed herein are directed to constructing a sub-tree or delta-tree for efficiently transmitting sparse 3DWM information to other platforms. Further, inventive concepts disclosed herein are directed to utilizing the multi-resolution nature of the OM octree by reducing the sub-tree/delta-tree maximum tree depth to the required size for the scenario. Further, inventive concepts disclosed herein are directed to quantizing the sub-tree/delta-tree occupancy value to the resolution required by remote platforms including, but not limited to, converting to one-bit (e.g., occupied/not occupied). Further, inventive concepts disclosed herein are directed to applying the inherent OM octree pruning on the sub-tree/delta-tree to further shrink the data needs. Further, inventive concepts disclosed herein are directed to scheduling the change detection timeline to accommodate the multi-platform 3DWM timeliness needs versus efficiency of larger delta-trees.

It is to be understood that embodiments of the methods in accordance with the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A system, comprising:
   a leader vehicle comprising a leader vehicle controller, the leader vehicle controller comprising one or more processors and memory configured to store one or more sets of program instructions, the one or more processors configured to execute the one or more sets of program instructions, the one or more sets of program instructions configured to cause the one or more processors to:
   receive three-dimensional perception sensor (3DPS) data;
   generate a data message comprising an occupancy map (OM) octree, the OM octree generated from an occupancy map constructed from the 3DPS data, the OM octree comprising a select number of levels,
   wherein each level comprises a plurality of nodes representing a plurality of voxels, each voxel of the plurality of voxels being occupied, free, or unknown,
   wherein the OM octree represents a position of a select child node of the plurality of nodes relative to a select parent node of the plurality of nodes as a three-bit value,
   wherein the select number of levels within the OM octree is dependent on a resolution of the 3DPS data,
   wherein the resolution of the 3DPS data is a four-meter resolution responsive to the leader vehicle being at a first distance from an environment object or the location greater than a threshold distance from the environment object or the location, and the resolution of the 3DPS data is a one-meter resolution responsive to the leader vehicle being at a second distance from the environment object or location less than the threshold distance from the environment object or location;
   reduce at least one of a messaging time or a messaging size of the data message comprising the OM octree by quantizing the select child node to a single-bit value, the single-bit value indicating whether the select child node represents an occupied voxel or a free voxel;
   transmit the data message comprising the OM octree; and
   adjust a path of travel of the leader vehicle based on the occupancy map; and
   a follower vehicle comprising a follower vehicle controller, the follower vehicle controller comprising one or more processors and memory configured to store one or more sets of program instructions, the one or more processors configured to execute the one or more sets of program instructions, the one or more sets of program instructions configured to cause the one or more processors to:

receive the data message comprising the OM octree;
generate a local occupancy map from the data message comprising the OM octree; and
adjust a path of travel of the follower vehicle based on the local occupancy map.

2. The system of claim 1, wherein the leader vehicle is a leader aircraft and the leader vehicle controller is a leader aircraft controller, wherein the follower vehicle is a follower aircraft and the follower vehicle controller is a follower aircraft controller.

3. A method comprising:
receiving, via a leader vehicle controller installed within a leader vehicle, three-dimensional perception sensor (3DPS) data;
generating, via the leader vehicle controller, a data message comprising an occupancy map (OM) octree, the OM octree generated from an occupancy map constructed from the 3DPS data, the OM octree comprising a select number of levels,
wherein each level comprises a plurality of nodes representing a plurality of voxels, each voxel of the plurality of voxels being occupied, free, or unknown,
wherein the OM octree represents a position of a select child node of the plurality of nodes relative to a select parent node of the plurality of nodes as a three-bit value,
wherein the select number of levels within the OM octree is dependent on a resolution of the 3DPS data,
wherein the resolution of the 3DPS data is a four-meter resolution responsive to the leader vehicle being at a first distance from an environment object or a location greater than a threshold distance from the environment object or the location, and the resolution of the 3DPS data is a one-meter resolution responsive to the leader vehicle being at a second distance from the environment object or location less than the threshold distance from the environment object or the location;
reducing, via the leader vehicle controller, at least one of a messaging time or a messaging size of the data message comprising the OM octree by quantizing the select child node to a single-bit value, the single-bit value indicating whether the select child node represents an occupied voxel or a free voxel;
transmitting, via the leader vehicle controller, the data message comprising the OM octree;
adjusting, via the leader vehicle controller, a path of travel of the leader vehicle based on the occupancy map;
receiving the data message comprising the OM octree via a follower vehicle controller installed within a follower vehicle;
generating a local occupancy map from the data message comprising the OM octree via the follower vehicle controller communicatively coupled to the follower vehicle,
wherein the data message comprising the OM octree is transmitted via the leader vehicle controller communicatively coupled to the leader vehicle; and
adjusting, via the follower vehicle controller, a path of travel of the follower vehicle based on the local occupancy map.

* * * * *